United States Patent
Lee et al.

(10) Patent No.: US 8,606,280 B2
(45) Date of Patent: Dec. 10, 2013

(54) APPARATUS AND METHOD FOR ALLOCATING RESOURCES BASED ON ERROR VECTOR MAGNITUDE (EVM) IN A BROADBAND WIRELESS COMMUNICATION SYSTEM

(75) Inventors: Joo-Hyun Lee, Suwon-si (KR); Young-Hoon Kwon, Seongnam-si (KR); Sang-Boh Yun, Seongnam-si (KR); Won-Suk Choi, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1039 days.

(21) Appl. No.: 12/283,803

(22) Filed: Sep. 16, 2008

(65) Prior Publication Data

US 2009/0075659 A1    Mar. 19, 2009

(30) Foreign Application Priority Data

Sep. 17, 2007 (KR) .................. 10-2007-0094019

(51) Int. Cl.
| | |
|---|---|
| H04W 72/00 | (2009.01) |
| H04J 11/00 | (2006.01) |
| H04W 4/00 | (2009.01) |
| H04L 12/28 | (2006.01) |
| H04J 3/00 | (2006.01) |
| H04B 3/46 | (2006.01) |
| H04L 27/00 | (2006.01) |
| H04L 27/28 | (2006.01) |
| H04B 15/00 | (2006.01) |

(52) U.S. Cl.
USPC ...... 455/450; 455/451; 455/452.1; 455/452.2; 455/453; 455/454; 370/203; 370/206; 370/329; 370/431; 370/464; 375/224; 375/227; 375/259; 375/260; 375/285

(58) Field of Classification Search
USPC .......... 455/450–454, 464, 509; 370/329, 330, 370/341, 437, 468, 203; 375/224, 227, 375/259–260, 285, 377
See application file for complete search history.

(56) References Cited

U.S. PATENT DOCUMENTS

| | | | |
|---|---|---|---|
| 6,859,443 B1 * | 2/2005 | Mushkin | 370/324 |
| 2002/0176364 A1 * | 11/2002 | Nakamura et al. | 370/243 |
| 2005/0197133 A1 * | 9/2005 | Hong et al. | 455/450 |
| 2007/0191017 A1 * | 8/2007 | Han et al. | 455/442 |
| 2007/0206695 A1 * | 9/2007 | Ye et al. | 375/267 |

FOREIGN PATENT DOCUMENTS

| | | |
|---|---|---|
| KR | 1020050066860 A | 6/2005 |
| KR | 1020070027468 A | 3/2007 |
| KR | 100705501 B1 | 4/2007 |

* cited by examiner

Primary Examiner — Olumide T Ajibade Akonai
Assistant Examiner — Dung Hong (57) ABSTRACT

A resource allocation in a broadband wireless communication system is provided. An apparatus for a base station in a broadband wireless communication system includes a manager for managing resources by dividing the resources into a plurality of regions based on a maximum supportable error vector magnitude (EVM) in a frequency axis; and an allocator for allocating resources of a region other than a first region, the region having the smallest maximum supportable EVM, to a service to which a maximum modulation and coding scheme (MCS) level is not applied.

20 Claims, 7 Drawing Sheets

APPARATUS AND METHOD FOR ALLOCATING RESOURCES BASED ON ERROR VECTOR MAGNITUDE (EVM) IN A BROADBAND WIRELESS COMMUNICATION SYSTEM

CROSS-REFERENCE TO RELATED APPLICATION(S) AND CLAIM OF PRIORITY

The present application claims priority under 35 U.S.C. §119(a) to a Korean patent application filed in the Korean Intellectual Property Office on Sep. 17, 2007 and assigned Serial No. 2007-94019, the entire disclosure of which is hereby incorporated by reference.

TECHNICAL FIELD OF THE INVENTION

The present invention relates generally to a broadband wireless communication system. More particularly, the present invention relates to a resource allocation in the broadband wireless communication system.

BACKGROUND OF THE INVENTION

In general, to define a specification for a wireless communication system, a signal to noise ratio (SNR) required for the reception is measured by conducting a simulation on a service to support or on a modulation and coding scheme (MCS) level under assumed channel conditions. Thus, a constellation error or an error vector magnitude (EVM) required at a transmitter is determined. Herein, the required EVM indicates a magnitude of the constellation error at the transmitter regardless of the channel and a receiver, which is caused by adjacent channel interference from an adjacent frequency allocation (FA), quantization based on a fixed-point design, phase noise of a radio frequency (RF) device of the transmitter, and nonlinearity of an amplifier (AMP). Unlike the SNR, the required EVM exhibits no enhancement even when the transmit power is increased. Accordingly, it is necessary to define the required EVM in the specification of the transmitter. Next, the supportable MCS level, a guard band, an FA structure, and an RF equipment requirement are determined.

A specification of the Institute of Electrical and Electronics Engineers (IEEE) 802.16e system demands the required EVM of −15 dB ∼−30 dB to support modulation schemes ranging from quadrature phase shift keying (QPSK) to 64 quadrature amplitude modulation (QAM). Yet, the modulation scheme is not distinguished in the resource allocation. That is, a certain modulation scheme should support every resource. To this end, the guard band and the RF equipment are designed to meet the require EVM −30 dB of the maximum MCS level.

As discussed above, to support the maximum MCS level in every resource region, the number of available subcarriers decreases as the guard band becomes wider. Further, in response to the increasing demands for the broad band in a next-generation wireless communication system, when a plurality of FAs is bundled or the bandwidths are overlaid, the degradation of the resource allocation efficiency because of the wide guard band is inevitable.

SUMMARY OF THE INVENTION

To address the above-discussed deficiencies of the prior art, it is a primary object to provide at least the advantages described below. Accordingly, an aspect of the present invention is to provide an apparatus and a method for increasing the efficiency of a resource utilization in a broadband wireless communication system.

Another aspect of the present invention is to provide an apparatus and a method for decreasing a guard band in a broadband wireless communication system.

Yet another aspect of the present invention is to provide an apparatus and a method for managing and allocating resources by dividing the resources into a plurality of regions based on a required Error Vector Magnitude (EVM) in a broadband wireless communication system.

The above aspects are achieved by providing an apparatus for a base station in a broadband wireless communication system. The apparatus includes a manager for managing resources by dividing the resources into a plurality of regions based on a maximum supportable EVM in a frequency axis; and an allocator for allocating resources of a region other than a first region, the region having the smallest maximum supportable EVM, to a service to which a maximum modulation and coding scheme (MCS) level is not applied.

According to one aspect of the present invention, a method for allocating resources of a base station in a broadband wireless communication system includes managing resources by dividing the resources into a plurality of regions based on a maximum supportable EVM in a frequency axis; and allocating resources of a region other than a first region, the region having the smallest maximum supportable EVM, to a service to which a maximum MCS level is not applied.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged broadband wireless communication system.

Exemplary embodiments of the present invention provide a technique for utilizing a guard band determined to meet a maximum modulation and coding scheme (MCS) level in a broadband wireless communication system. While an orthogonal frequency division multiplexing (OFDM) wireless communication system is illustrated by way of example, the present invention is applicable to any other wireless communication systems.

Figure 1:
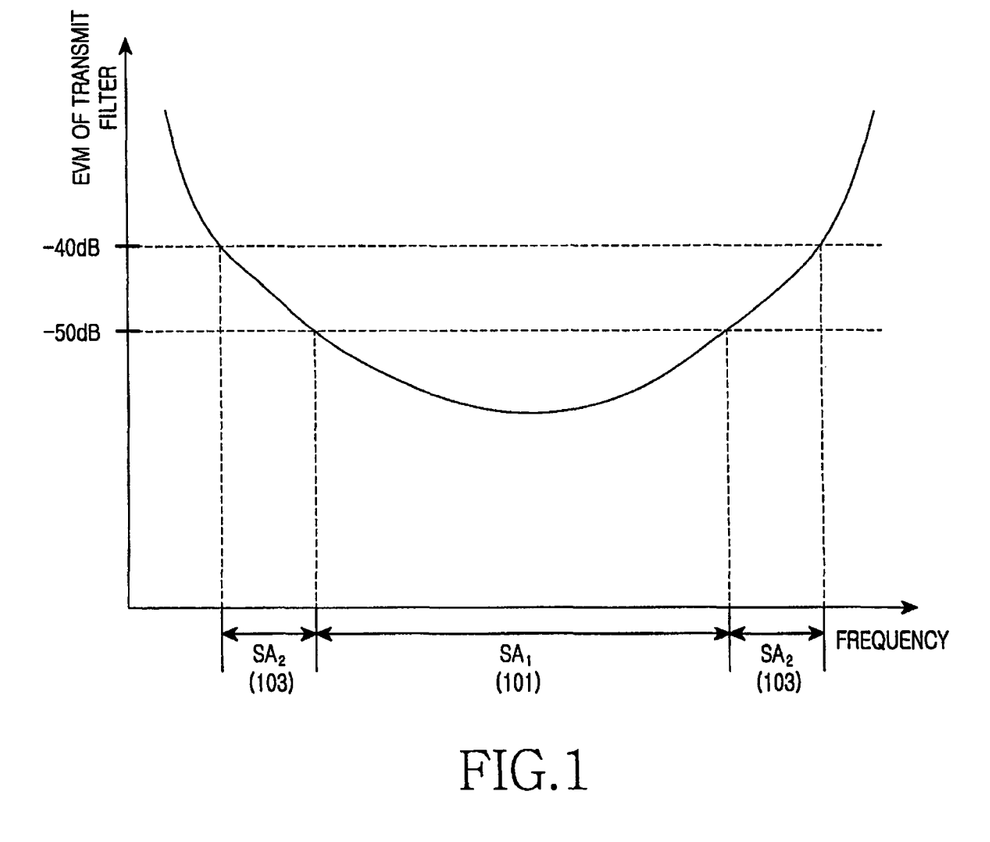
FIG. 1 illustrates a division of subcarrier allocation regions in a broadband wireless communication system according to an exemplary embodiment of the present invention.
Figure 2:
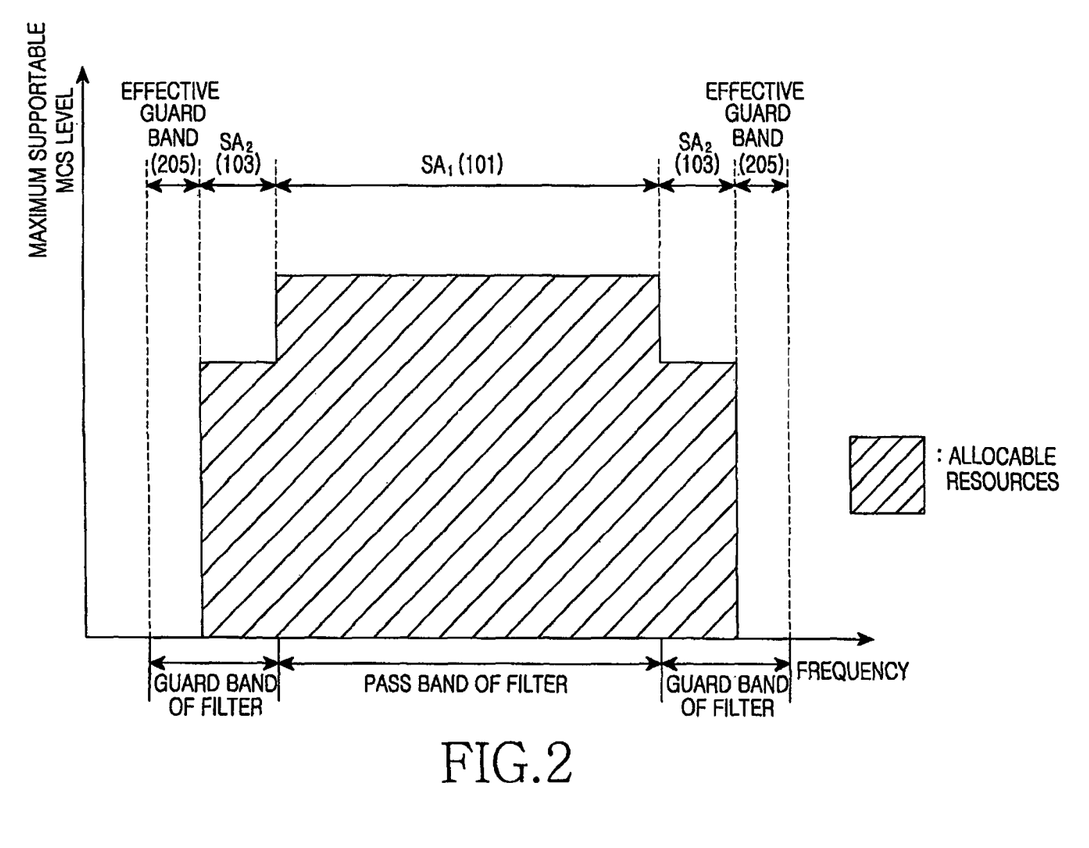
FIG. 2 illustrates a maximum supportable Modulation and Coding Scheme (MCS) level of the subcarrier allocation regions in the broadband wireless communication system according to an exemplary embodiment of the present invention.

To utilize the guard band determined to meet the maximum MCS level, the broadband wireless communication system of the present invention divides the resource region into a plurality of subcarrier allocations (SAs) based on the error vector magnitude (EVM) characteristic of a transmit filter as shown in FIG. 1. A frequency allocation (FA) of FIG. 1 includes $SA_1$ 101 and $SA_2$ 103. The SAs have different maximum supportable EVMs respectively. That is, the range of the EVM to be satisfied for the resource allocation differs per SA. Accordingly, the $SA_1$ 101 and the $SA_2$ 103 of FIG. 2 have different maximum supportable MCS levels. In detail, the $SA_1$ 101 supports every MCS level required in the system, and the $SA_2$ 103 supports some MCS levels. Thus, the system can attain an effective guard band 205 narrower than the guard band of the transmit filter. While merely two SAs are depicted in FIG. 1 and FIG. 2, the number of the SAs may differ in various embodiments of the present invention. The SAs are distinguished based on the maximum supportable EVM as expressed in Equation 1.

$$SA_i = \{f | EVM_{i-1} \le f < EVM_i\}, i=1,2,\ldots,N. \quad [\text{Eqn. 1}]$$

In Equation 1, $SA_i$ denotes an i-th SA, f denotes a subcarrier index, $EVM_i$ denotes a maximum supportable EVM of the i-th SA, and N denotes the number of SAs.

For example, when there are two SAs, the SAs can be utilized as follows. For the $SA_1$ 101 and the $SA_2$ 103 of FIG. 1, provided that the maximum supportable EVM of the $SA_1$ 101 is −50 dB and the maximum supportable EVM of the $SA_2$ 103 is −40 dB, a base station uses the $SA_1$ 101 to support the MCS level of the maximum 64 quadrature amplitude modulation (QAM) for every service, and uses the $SA_2$ 103 to transmit a continual pilot using a binary phase shift keying (BPSK), to transmit an identifier (ID) for a relay station, and to allocate a virtual circuit for voice over internet protocol (VoIP). Namely, the base station provides the service requiring the comparatively low MCS level through the $SA_2$ 105. Thus, using only one SA, the base station utilizes subcarriers of the guard band.

Note that the present invention is applicable to not only the single FA but also a plurality of FAs in the broadband wireless communication system. When three FAs are used and each FA includes two SAs as shown in FIGS. 3A and 3B, the resource allocation in the broadband wireless communication system are performed as follows.

Figure 3A:
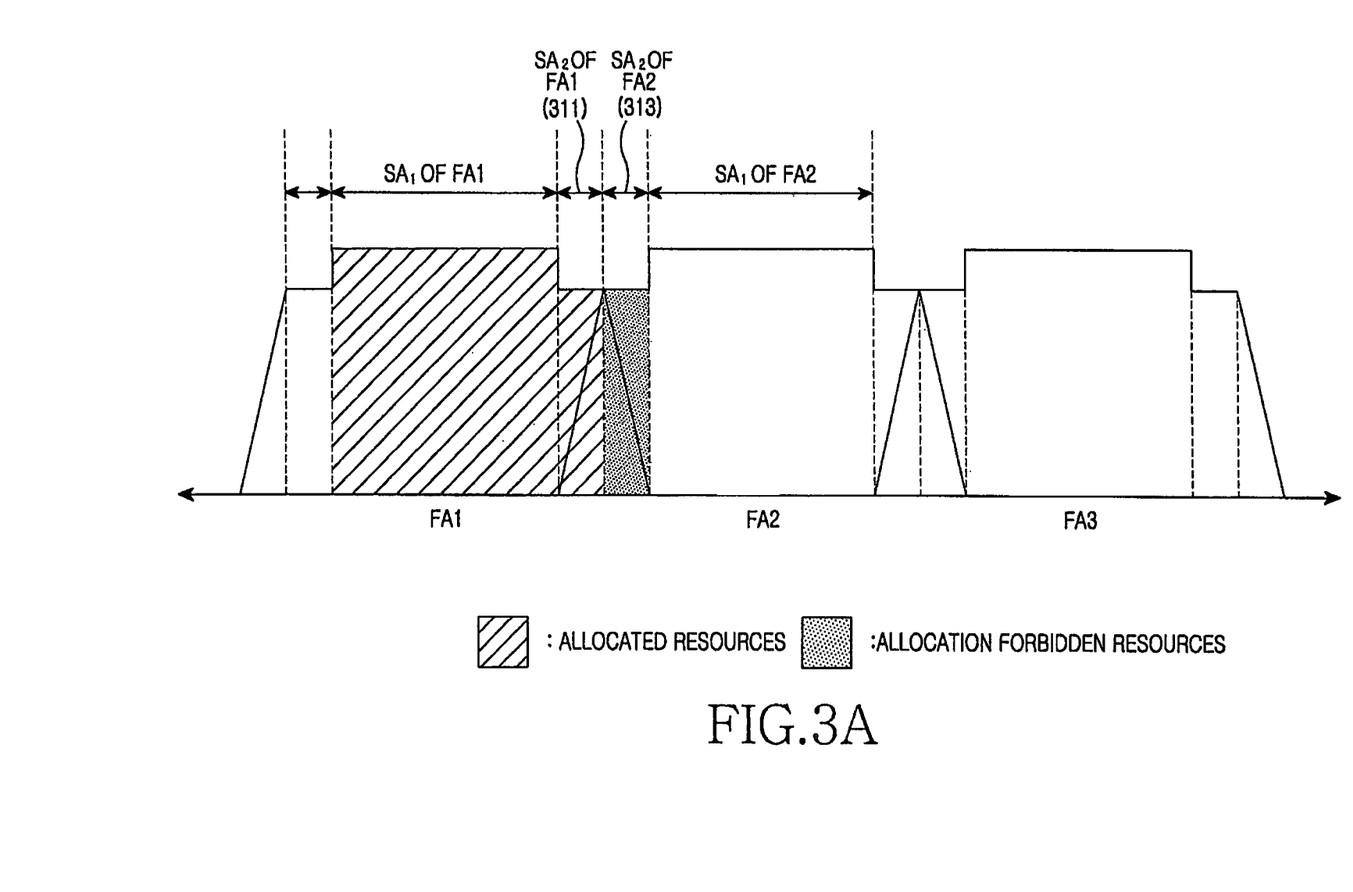
FIG. 3A illustrates a resource utilization in the broadband wireless communication system according to an exemplary embodiment of the present invention.

FIG. 3A depicts a resource use of a base station which communicates with a terminal A allowing only one FA connection. When the terminal A, which currently uses resources in the FA1, requests additional resource allocation, the base station checks available resources and then allocates resources. In a conventional system, when there is only one SA and there are no available resources in the FA1, the base station needs to allocate the resource after having the terminal A perform handover to an FA2 or an FA3 for the resource allocation. However, for a plurality of SAs in this embodiment of the present invention, the base station can additionally allocate resources in the $SA_2$ 311 of the FA1 to the terminal A. When the base station allocates the resources in the $SA_2$ 311 of the FA1 to the terminal A, the terminal A occupies the $SA_2$ 311 of the FA1, which causes interference between the FA1 and the FA2. To avoid the interference between the FAs, the base station sets the $SA_2$ 313 of the FA2 adjacent to the $SA_2$ 311 of the FA1 used by the terminal A, as an allocation forbidden region.

Figure 3B:
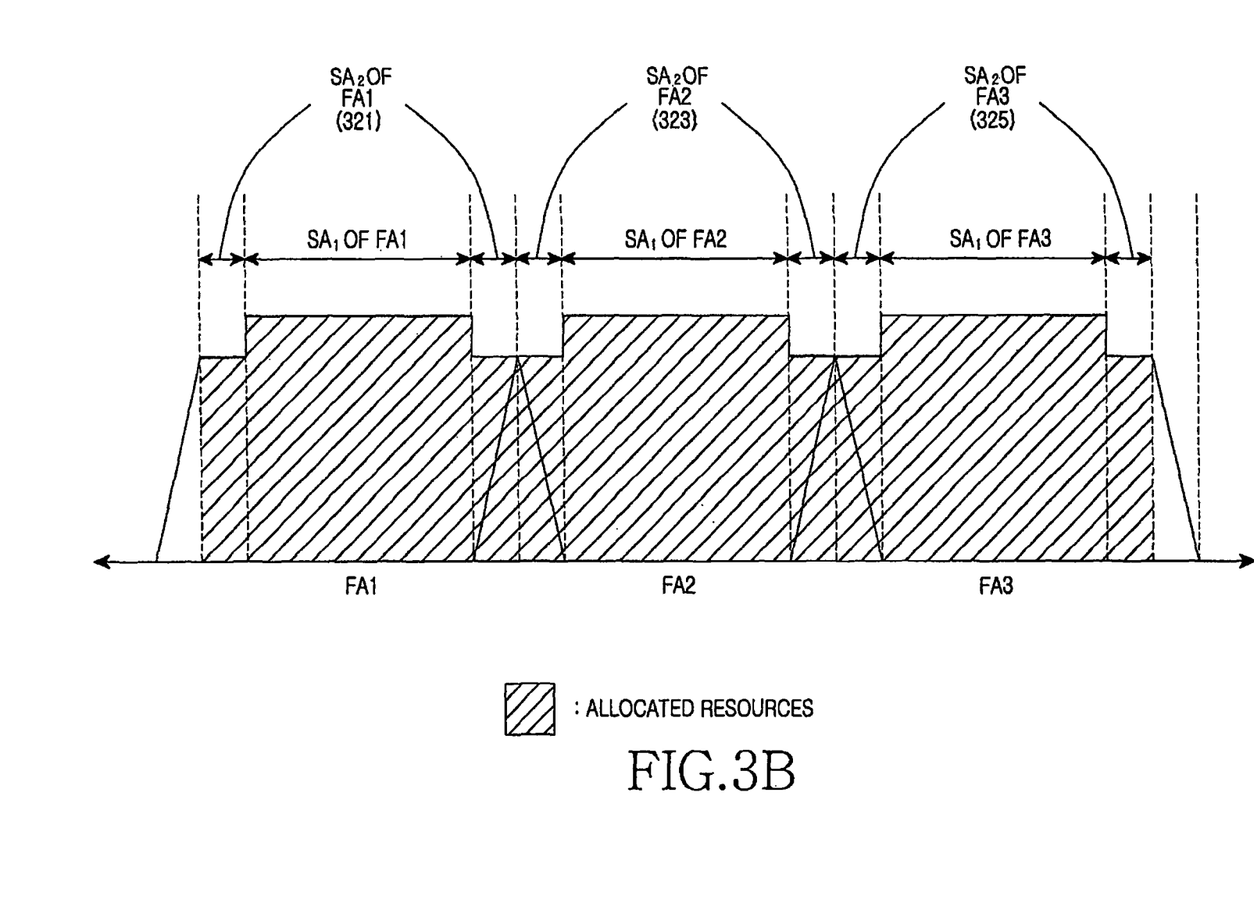
FIG. 3B illustrates a resource utilization in the broadband wireless communication system according to an exemplary embodiment of the present invention.

FIG. 3B depicts a resource use of a base station which communicates with a terminal B allowing a multi-FA connection. When the terminal B can use three FAs at the same time, the base station can allocate not only $SA_1$ of the three FAs but also $SA_2$ 321, 323, and 325 between the FAs to the terminal B. When the terminal B occupies every $SA_2$, there is no need to set the allocation forbidden region because no interference occurs between the FAs. Hence, the base station can efficiently utilize the resources, compared to the service to the single-FA terminal.

Figure 4:
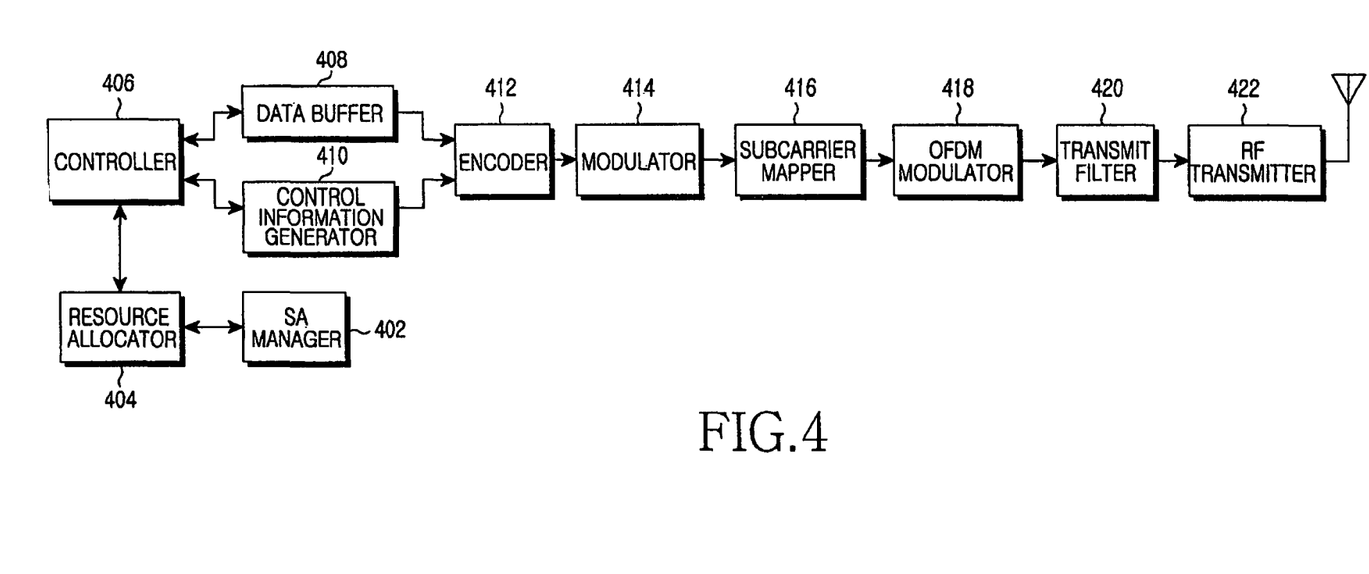
FIG. 4 illustrates a structure of a base station in the broadband wireless communication system according to an exemplary embodiment of the present invention.

FIG. 4 is a block diagram of a base station in the broadband wireless communication system according to an exemplary embodiment of the present invention.

The base station of FIG. 4 includes an SA manager 402, a resource allocator 404, a controller 406, a data buffer 408, a control information generator 410, an encoder 412, a modulator 414, a subcarrier mapper 416, an OFDM modulator 418, a transmit filter 420, and a radio frequency (RF) transmitter 422.

The SA manager 402 manages resources by dividing the resources into a plurality of SAs in a frequency axis according to the maximum supportable EVM. More specifically, the SA manager 402 manages present allocation information and present forbidden allocation information of the SAs per FA, and provides the present resource information of SA to the resource allocator 404. Herein, the plurality of the SAs includes at least two SAs, and the number of the SAs differs in various implementations. One of the SAs has a maximum supportable EVM enough to apply the maximum MCS level. That is, one of the SAs is included to the pass band of the transmit filter 420. Hereinafter, the SA having the maximum supportable EVM enough to apply the maximum MCS level is referred to as a $SA_1$ and one or more other SAs are referred to as $SA_2, \ldots,$ and $SA_N$.

The resource allocator 404 allocates radio resources to terminals. Particularly, the resource allocator 404 allocates the resources other than the $SA_1$, which have the smallest maximum supportable EVM (i.e., the resources in the guard band of the transmit filter 420), to a service to which the maximum MCS level is not applied. When a terminal capable of connecting a plurality of FAs at the same time occupies all of $SA_2$ through $SA_N$ of adjacent FAs, interference caused by the absence of the guard band does not occur. Yet, when only $SA_2$ through $SA_N$ of one FA are used, the adjacent FA suffers interference to $SA_2$ through $SA_N$. Hence, to allocate the resources of $SA_2$ through $SA_N$ to a terminal allowing only one FA connection, the resource allocator 404 checks whether it is possible to borrow $SA_2$ through $SA_N$ of the adjacent FA interfered by the resources of $SA_2$ through $SA_N$. That is, the resource allocator 404 checks whether it is possible to set $SA_2$ through $SA_N$ of the adjacent FA as an allocation forbidden region. The setting allocation forbidden region is possible in two cases as follows. First, when the corresponding resources are not occupied yet. Second, the corresponding resource, which is occupied by a certain service, could become unoccupied by reallocating the certain service to other region. When $SA_2$ through $SA_N$ of the adjacent FA can be borrowed, the resource allocator 404 forbids the use of $SA_2$ through $SA_N$ of the adjacent FA and allocates resources of $SA_2$ through $SA_N$ to the terminal. By contrast, when it is infeasible to borrow $SA_2$ through $SA_N$ of the adjacent FA, the resource allocator 404 informs the controller 406 of the insufficient resources to be allocated to the terminal in the corresponding FA, and allocates resources after the handover of the terminal between the FAs.

The controller 406 controls a media access control (MAC) layer of the base station. For instance, being informed of the insufficient resources to be allocated to the terminal allowing only one FA connection from the resource allocator 404, the controller 406 controls the control information generator 410 to generate a message which instructs the handover of the terminal between the FAs.

The data buffer 408 temporarily stores data to be transmitted to the terminal, and outputs corresponding data according to the result of the resource allocation of the resource allocator 404. The control information generator 410 generates a control message to be sent to the terminal. The encoder 412 encodes information bit streams output from the data buffer 408 and the control information generator 410 according to a corresponding coding scheme. The modulator 414 converts the encoded bit stream output from the encoder 412 to complex symbols by modulating the bit stream according to a corresponding modulation scheme.

The subcarrier mapper 416 maps the complex symbols output from the modulator 414 to subcarriers according to the result of the resource allocation of the resource allocator 404. The OFDM modulator 418 converts the frequency-domain signals output from the subcarrier mapper 416 to time-domain signals using inverse fast fourier transform (IFFT). The transmit filter 420 filters the signals in accordance with the band occupied by one FA. The RF transmitter 422 converts the signal output from the transmit filter 420 to an analog signal, up-converts the analog signal to an RF signal, and then transmits the RF signal via an antenna.

Figure 5:
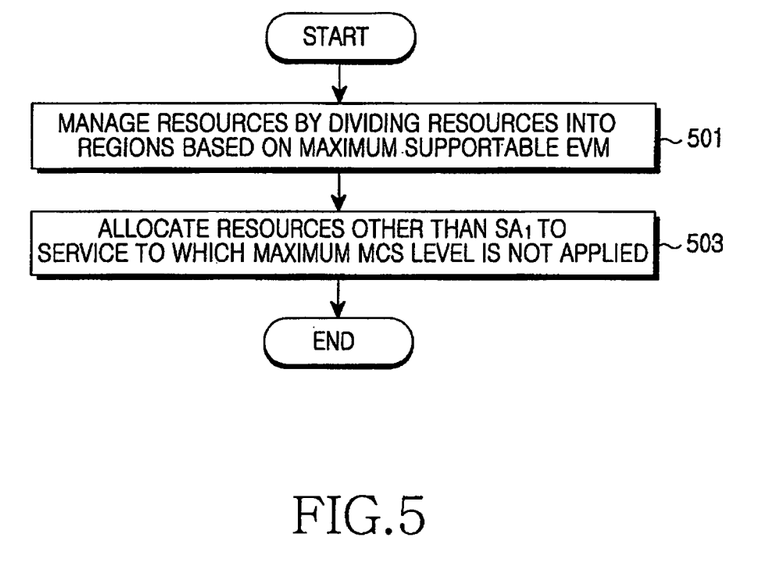
FIG. 5 illustrates a resource allocating method of the base station in the broadband wireless communication system according to an exemplary embodiment of the present invention.

FIG. 5 illustrates a resource allocating method of the base station in the broadband wireless communication system according to an exemplary embodiment of the present invention.

The base station manages resources by dividing the resources into a plurality of SAs in the frequency axis based on the maximum supportable EVM in step 501. More specifically, the base station manages the present allocation information and the present forbidden allocation information of the SAs of each FA. Herein, the SAs include at least two SAs and the number of the SAs differs in various implementations. One of the SAs has the maximum supportable EVM enough to apply the maximum MCS level. That is, one of the SAs is included to the pass band of the transmit filter 420. Hereafter, the SA having the maximum supportable EVM enough to apply the maximum MCS level is referred to as a $SA_1$ and one or more other SAs are referred to as $SA_2, \ldots,$ and $SA_N$.

In step 503, the base station allocates the resources other than the $SA_1$, which have the smallest maximum supportable EVM (i.e., the resources in the guard band of the transmit filter 420), to a service to which the maximum MCS level is not applied. When a terminal capable of connecting a plurality of FAs at the same time occupies all of $SA_2$ through $SA_N$ of adjacent FAs, interference caused by the absence of the guard band does not occur. Yet, when only $SA_2$ through $SA_N$ of one FA are used, the adjacent FA suffers interference in $SA_2$ through $SA_N$. Hence, to allocate the resources of $SA_2$ through $SA_N$ to a terminal allowing only one FA connection, the base station needs to check whether it is possible to borrow $SA_2$ through $SA_N$ of the adjacent FA interfered by the resources of $SA_2$ through $SA_N$. How to allocate the resources of $SA_2$ through $SA_N$ to the terminal allowing only one FA connection is explained in detail by referring to FIG. 6.

Figure 6:
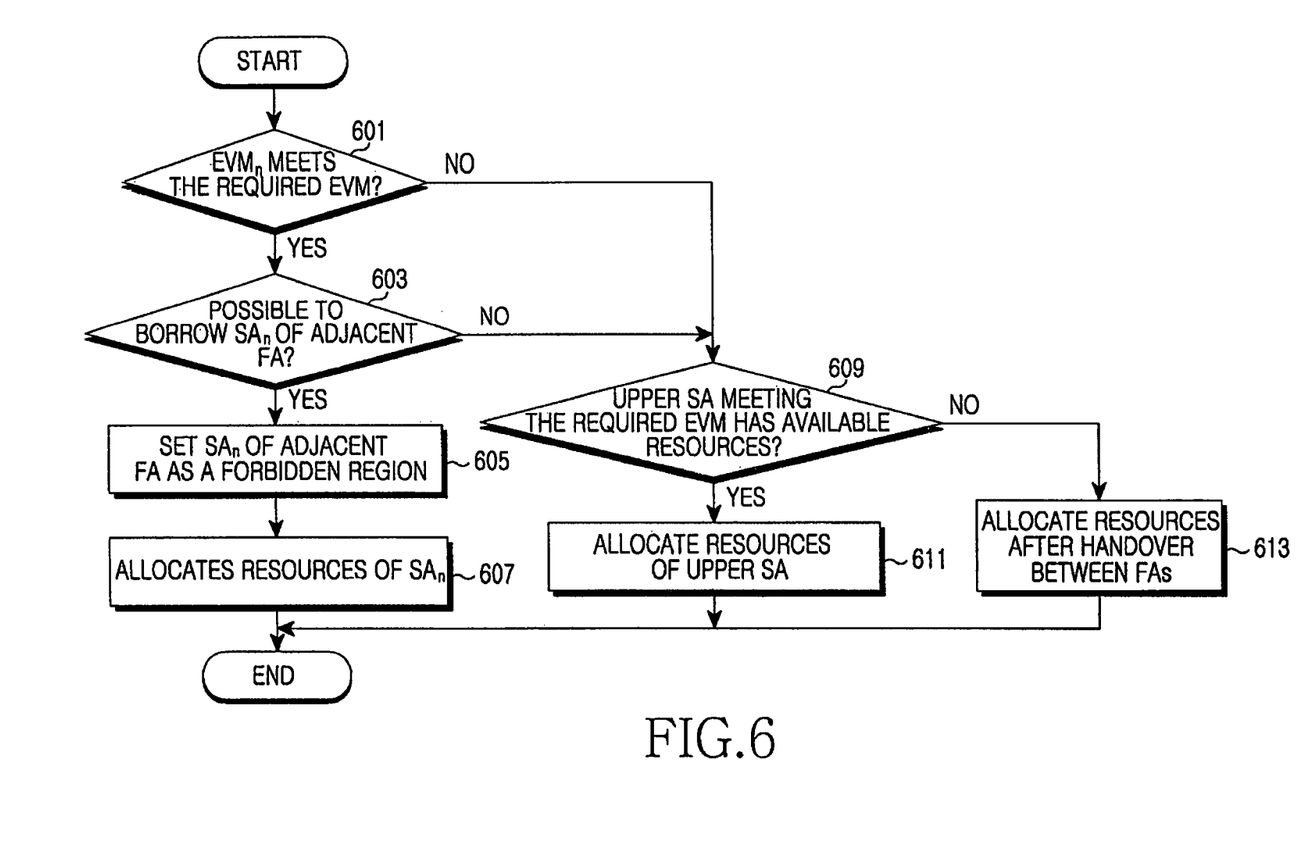
FIG. 6 illustrates a resource borrowing method of the base station in the broadband wireless communication system according to an exemplary embodiment of the present invention.

FIG. 6 illustrates a resource borrowing method of the base station in the broadband wireless communication system according to an exemplary embodiment of the present invention.

In step 601, the base station checks whether the maximum supportable $EVM_n$ of the $SA_n$ allocated to the terminal satisfies the required EVM to support the MCS level of the corresponding service. In other words, the base station checks whether the maximum supportable $EVM_n$ is less than or equal to the required EVM of the corresponding service. Herein, the $SA_n$ is one of $SA_2$ through $SA_n$.

When the required EVM is satisfied, the base station checks whether it is possible to borrow $SA_n$ of the adjacent FA in step 603. In more detail, the base station checks whether $SA_n$ of the adjacent FA is allocated or not, or whether a service occupying $SA_n$ of the adjacent FA can be reallocated to another region or not.

When it is possible to borrow $SA_n$ of the adjacent FA, the base station sets $SA_n$ of the adjacent FA as a forbidden region in step 605.

In step 607, the base station allocates resources of $SA_n$ to the terminal.

When the required EVM is not satisfied in step 601 or when it is infeasible to borrow $SA_n$ of the adjacent FA in step 603, the base station checks whether an upper SA meeting the required EVM has available resources in step 609. That is, the base station checks whether an SA meeting the required EVM amongst SAs having the maximum supportable EVM greater than $SA_n$ has available resources.

When the upper SA meeting the required EVM has available resources, the base station allocates the resources of the upper SA to the terminal in step 611. In doing so, when interference occurs to the neighbor FA in using the resources of the upper SA, the base station should check whether it is possible to borrow resources of the neighbor FA.

By contrast, when there are no resources in the upper SA meeting the required EVM, the base station has the terminal perform handover between the FAs and then allocates the resources in step 613.

As set forth above, the resources are managed and allocated by dividing the resources into a plurality of regions in the broadband wireless communication system. As the effective guard band becomes narrow, the resource utilization can be enhanced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for a base station in a wireless communication system, the base station comprising:
   a manager configured to manage a plurality of resources for each of a plurality of frequency allocations (FAs) by dividing the plurality of resources for each FA into a plurality of regions based on a maximum supportable error vector magnitude (EVM) in a frequency axis, wherein the EVM represents a magnitude of error due to radio frequency (RF) characteristic of a transmitter; and
   an allocator configured to allocate one or more resources of a region other than a first region, the first region having a smallest maximum supportable EVM among the plurality of regions, to a service to which a maximum modulation and coding scheme (MCS) level is not applied, and allocate resources of the region other than the first region to a terminal; and
   a controller device configured to cause the terminal to handover between FAs when informed by the allocator of insufficient resources to be allocated to the terminal.

2. The apparatus of claim 1, wherein the manager is further configured to divide and manage the regions per FA independently.

3. The apparatus of claim 1, wherein when allocating the resources of the region other than the first region to a the terminal which allows only a single FA connection, the allocator is further configured to allocate resources of the region other than the first region to the terminal when a region other than a first region of an FA adjacent to the resources allocated to the terminal can be borrowed.

4. The apparatus of claim 3, wherein after allocating the resources of the region other than the first region, the allocator is further configured to set the region other than the first region of the FA adjacent to the resources allocated to the terminal as an allocation forbidden region.

5. The apparatus of claim 3, wherein the allocator is further configured to allocate the resources of the region other than the first region to the terminal when a maximum supportable EVM of the region including the resources allocated to the terminal is not greater than a required EVM to support an MCS level of a corresponding service.

6. The apparatus of claim 5, wherein the allocator is further configured to allocate resources of an upper region which meets the required EVM when at least one of a set of conditions is satisfied, the set of conditions comprising when the region other than the first region in the FA adjacent to the resources allocated to the terminal can be borrowed and when the maximum supportable EVM of the allocated resources is greater than the required EVM.

7. The apparatus of claim 6, further comprising:
   wherein the controller is further configured to cause the terminal to perform handover between FAs when there are no allocable resources in the upper region with a maximum supportable EVM which is not greater than the required EVM,
   wherein the allocator is further configured to allocate resources after the FA handover of the terminal.

8. A method for allocating resources of a base station in a wireless communication system, the method comprising:
   dividing a plurality of resources for each of a plurality of frequency allocations (FAs) into a plurality of regions based on a maximum supportable error vector magnitude (EVM) in a frequency axis, wherein the EVM represents a magnitude of error due to radio frequency (RF) characteristic of a transmitter;
   allocating resources of a region other than a first region to a terminal, the first region having the smallest maximum supportable EVM among the plurality of regions, to a service to which a maximum modulation and coding scheme (MCS) level is not applied; and
   causing the terminal to handover between FAs when informed of insufficient resources to be allocated to the terminal.

9. The method of claim 8, wherein the one or more resources are divided independently per FA.

10. The method of claim 8, wherein when allocating the resources of the region other than the first region to a terminal which allows only a single FA connection, allocating the resources comprises allocating resources of the region other than the first region to the terminal when a region other than a first region in an FA adjacent to resources allocated to the terminal can be borrowed.

11. The method of claim 10, further comprising:
   after allocating the resources of the region other than the first region, setting the region other than the first region in the FA adjacent to the resources allocated to the terminal as an allocation forbidden region.

12. The method of claim 10, wherein allocating the resources comprises allocating the resources of the region other than the first region to the terminal when a maximum supportable EVM of the region including the resources allocated to the terminal is not greater than a required EVM to support an MCS level of a corresponding service.

13. The method of claim 12, wherein allocating the resources further comprises allocating resources of an upper region which meets the required EVM when at least one of a set of conditions is satisfied, the set of conditions comprising when the region other than the first region of the FA adjacent to the resources allocated to the terminal can be borrowed and when the maximum supportable EVM of the allocated resources is greater than the required EVM.

14. The method of claim 13, further comprising:
   causing the terminal to perform handover between FAs when there are no allocable resources in the upper region with a maximum supportable EVM which is not greater than the required EVM; and
   allocating resources after the FA handover of the terminal.

15. A method for allocating resources of a base station in a wireless communication system, the method comprising:
   dividing a plurality of resources for each of a plurality of frequency allocations (FAs) into a plurality of regions based on a maximum supportable error vector magnitude (EVM) in a frequency axis, the plurality of regions comprising at least a first region that supports a maximum modulation and coding scheme (MCS) level and has the smallest maximum supportable EVM among the plurality of regions, wherein the EVM represents a magnitude of error due to radio frequency (RF) characteristic of a transmitter;

allocating resources of a second region to a terminal, the second region being different from the first region, to a service to which a maximum modulation and coding scheme (MCS) level is not applied; and causing the terminal to handover between FAs when informed of insufficient resources to be allocated to the terminal.

16. The method of claim 15, wherein the one or more resources are divided independently per FA.

17. The method of claim 15, wherein when allocating the resources of the second region to a terminal which allows only a single FA connection, allocating the resources comprises allocating resources of the second region to the terminal when a second region of an FA adjacent to resources allocated to the terminal can be borrowed.

18. The method of claim 17, further comprising:
after allocating the resources of the second region, setting the second region in the FA adjacent to the resources allocated to the terminal as an allocation forbidden region.

19. The method of claim 17, wherein allocating the resources comprises allocating the resources of the second region to the terminal when a maximum supportable EVM of the region including the resources allocated to the terminal is not greater than a required EVM to support an MCS level of a corresponding service.

20. The method of claim 19, wherein allocating the resources further comprises allocating resources of an upper region which meets the required EVM when at least one of a set of conditions is satisfied, the set of conditions comprising when the second region of the FA adjacent to the resources allocated to the terminal can be borrowed and when the maximum supportable EVM of the allocated resources is greater than the required EVM.

* * * * *